May 23, 1939. J. C. STEDMAN Re. 21,096

CASHIER MACHINE

Original Filed March 22, 1934 2 Sheets-Sheet 1

Inventor

J. C. Stedman,

By John W. Farley

Attorney

May 23, 1939. J. C. STEDMAN Re. 21,096

CASHIER MACHINE

Original Filed March 22, 1934 2 Sheets-Sheet 2

Inventor

J. C. Stedman,

By John W. Farley

Attorney

Reissued May 23, 1939

Re. 21,096

UNITED STATES PATENT OFFICE 21,096

CASHIER MACHINE

Jacob C. Stedman, Memphis, Tenn.

Original No. 2,014,599, dated September 17, 1935, Serial No. 716,804, March 22, 1934. Application for reissue September 14, 1937, Serial No. 163,876

6 Claims. (Cl. 232—10)

Figure 1:
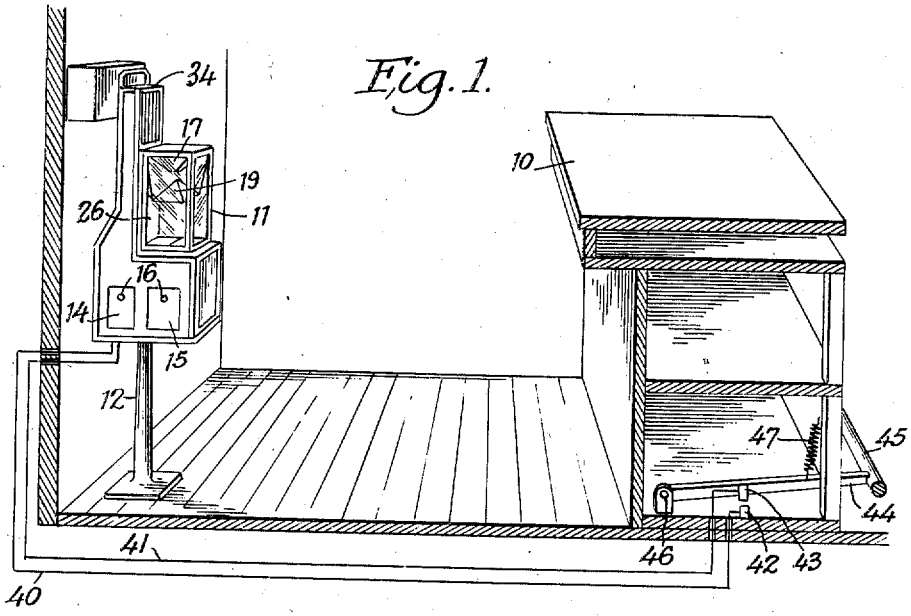

My invention relates to a cashier machine and it is an object of the same to provide an apparatus whereby predetermined sums of money varying in amount can be paid without requiring any employee of the recipient to handle any part of the actual receipts, such apparatus embodying means facilitating supervision by such employee.

Another object of the invention is to provide a distant control for the machine.

Other objects of the invention will appear from the annexed specification.

Figure 2:
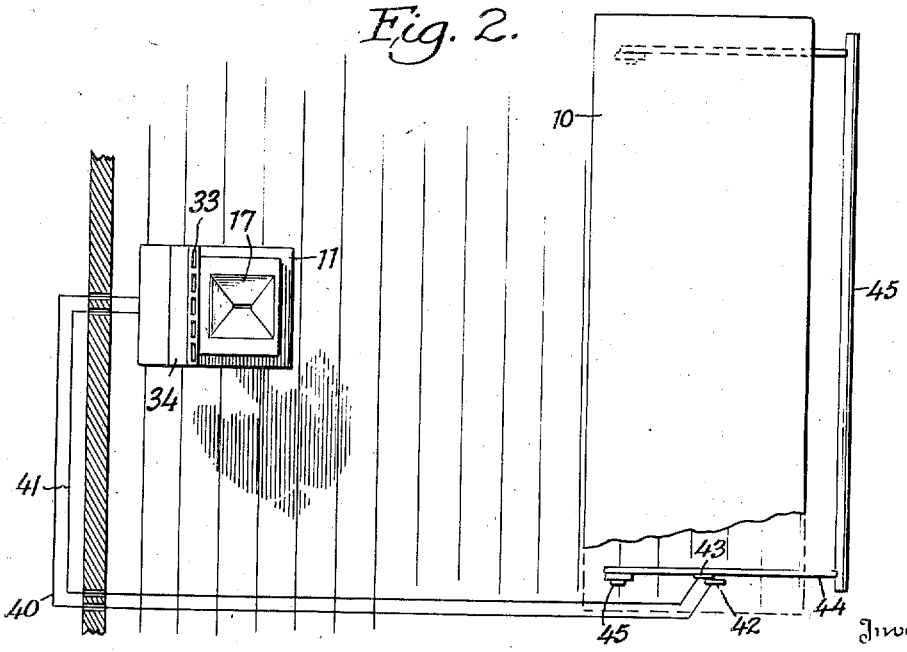
Figure 3:
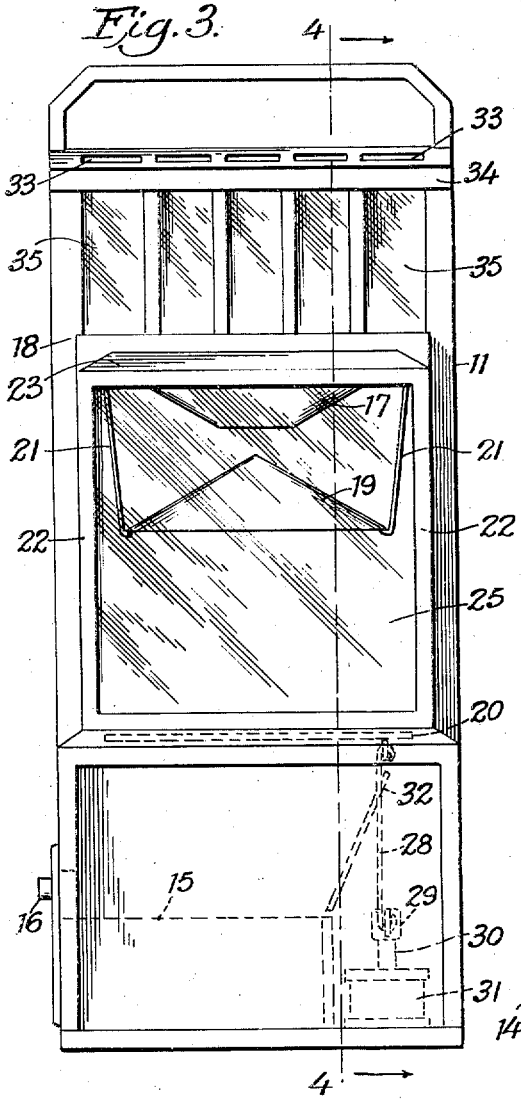
Figure 4:
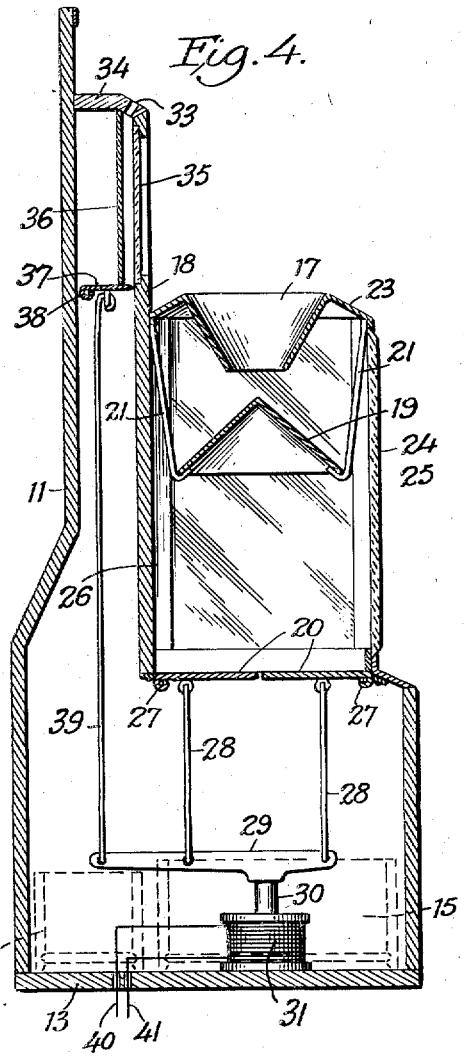

Referring to the drawings, which are made a part of this application and in which similar reference characters indicate similar parts:

Fig. 1 is a perspective, partially in section, illustrating the machine and its method of use, Fig. 2, a plan of parts shown in Fig. 1, Fig. 3, an elevation of the machine per se, on an enlarged scale, and Fig. 4, a vertical cross-section of the machine on line 4—4 of Fig. 3.

In the drawings, reference character 10 indicates generaly a counter which, for example, may be a lunch counter in a lunch room and reference character 11 indicates generally a cashier machine according to my invention located in a convenient and desirable position with reference to the counter, it being an object of my invention to so position the machine that an employee who is generally otherwise occupied can supervise and control the operation of the machine.

The machine may be supported on a pedestal 12, shown in Fig. 1, or in any other suitable manner and it comprises a casing having a bottom 13 supporting a pair of drawers 14 and 15 which can be withdrawn toward the left in Fig. 3, after unlocking them by means of a key inserted in a lock such as indicated at 16.

Above the drawer 15 there is a coin chute 17 which is suitably supported in a manner to close the portion of the casing in front of the wall 18. A baffle 19 is provided below the coin chute for checking the fall of coins through this part of the casing and for scattering them over the top of a pair of trap doors 20 which form the bottom of the compartment that temporarily receives the coins. The baffle is supported at its corners by strips of metal 21 which may be attached to the corner members 22 of said compartment or to the side portions 23 of the coin chute, or otherwise suitably supported.

The front and side walls 24, 25 of the temporary coin compartment are made of transparent material such as glass and a mirror 26 is provided at the rear of the compartment to aid in illuminating the interior of the same, and the coins therein.

The trap doors 20 are pivoted at 27, 27 and may be held in place by suitable springs. For operating the doors, I have shown a pair of links 28 depending from the doors and pivoted thereto, said links being connected at their lower ends to a bar 29 secured to or forming part of the armature 30 of an electromagnet 31, shown as located on the bottom member 13 of the casing. It will be obvious that coins supported on the trap doors may be dumped off the same by energizing the electromagnet so as to pull the doors downward about their pivots 27, thus causing the coins to fall into the drawer 15. In order to insure against any coins falling into that part of the casing occupied by the electromagnet and the operating device connected therewith, I provide a deflecting wall 32 which occupies an inclined position so as to direct into the drawer 15 any coins that might otherwise fall into the right hand end of the casing, as indicated in Fig. 3.

At the back of the casing and above the coin chute I provide means for receiving such tickets as are commonly used in lunch rooms and in other places for indicating the amount to be paid to the cashier. Such means comprises a series of slots in a member 34 of the casing. Below the slots I provide a series of transparent windows 35, each so positioned as to expose a ticket inserted through a slot 33, the tickets being supported adjacent the windows by a backing 36 and a trap door 37 which closes the bottom of the space between windows 35 and backing 36.

The trap door 37 is pivoted at 38 and a link 39 is pivoted to the trap door and to the bar 29 at its opposite ends so that the action of the electromagnet will open the trap door 37 whereupon the tickets resting on said trap door fall through the rear compartment of the casing into the drawer 14.

For operating the electromagnet I provide a circuit comprising conductors 40 and 41 connected respectively to a pair of contacts 42 and 43. The contact 43 is mounted on an arm 44 of a treadle 45 pivoted at 46 and normally held up by a spring 47, which treadle may extend the full length of the counter and be suitably supported at desirable intervals.

In the operation of my device customers will be waited on at the counter as usual and will receive checks or tickets in ordinary manner. When leaving the place they will pass by the cashier machine, conveniently located with reference to the exit, and each customer will insert his ticket in one of the slots provided for that purpose, at the same time placing in the coin chute coins of value corresponding to the amount stated on the ticket. If a customer does not have the correct change it will be necessary to secure the same; e. g., from a counter man. One customer may have several tickets in which case he may insert them in different ones of the slots and will place the aggregate amount corresponding to the numerals on the various tickets in the coin chute, from which the coins will fall down upon the trap doors 20, being suitably scattered by the baffle 19, so that a clerk or counter man behind the counter can glance over and see that the deposited coins correspond to the amount on the ticket or tickets. If he sees that the amount deposited is correct he will simply depress the treadle 45, thus closing the circuit to electromagnet 31, whereupon the armature 30 and bar 29 will be drawn downward, thus opening trap doors 20 and 37 to permit the coins to descend into drawer 15 while the tickets will descend into drawer 14. Any suitable means may be provided for returning the trap doors and associated parts to the position shown in Fig. 4, after the circuit has been broken due to the release of the treadle by the counter man.

It will be obvious that the sum total of the money in the cash drawer will equal the sum total on the amounts of the tickets in the ticket drawer and that no cash will be handled by any employee excepting the one who has a key to the drawers.

It will be obvious to those skilled in the art that many changes may be made in the device of my disclosure all without departing from the spirit of the invention and therefore I do not limit myself to what is shown in the drawings or described in the specification but only as indicated in the appended claims.

Having thus fully described my said invention, what I claim as new and desire to secure by Letters Patent is:

1. In a store device, means to hold a ticket in position to expose a face thereof, means to expose money in position for comparison with indicia on a ticket so exposed, a receptacle for the coins, a receptacle for the tickets, means for dumping the money and tickets into the respective receptacles after such comparison, said last-named means comprising pivoted trap doors supporting the tiskets and money, an electromagnet below said doors, links depending from said doors and a vertically movable horizontal bar carried by the armature of said electromagnet, each of said links being attached to said bar.

2. In a store service device adapted to be set at a distance from a counter and facing the same, means to hold a ticket in position to expose a face thereof, means to expose money in position for comparison with indicia on a ticket so exposed, a receptacle for the coins, a receptacle for the tickets, means for dumping the money and tickets into the respective receptacles after such comparison, said last-named means comprising trap doors supporting the tickets and money, an electromagnet, an armature for said electromagnet connected to each of said trap doors, a circuit for said electromagnet, and means at said counter for closing this circuit.

3. In a store service device adapted to be set at a distance from a counter and facing the same, means to hold a ticket in position to expose a face thereof, means to expose money in position for comparison with indicia on a ticket so exposed, a receptacle for the coins, a receptacle for the tickets, means for dumping the money and tickets into the respective receptacles after such comparison, said last-named means comprising trap doors supporting the tickets and money, an electromagnet, an armature for said electromagnet connected to each of said trap doors, a circuit for said electromagnet, circuit-closing means including a treadle positioned behind said counter, a contact on the treadle, and a fixed contact in said circuit, said fixed contact being operatively related to the contact on the treadle.

4. A device of the character described comprising a coin receiving box, a movable member for normally holding coins therein in display position, a ticket receiving case associated with said box, a movable member for normally holding tickets in said case in display position, and means for operating said movable members for releasing the coins and tickets, said last named means including movable supports for the tickets and money, an electromagnet, an armature operable by said electromagnet, and means interposed between said electromagnet and movable supports for actuating the latter upon movement of the armature.

5. A device of the character described comprising a coin receiving box, a movable member for normally holding coins therein in display position, a ticket receiving case associated with said box, a movable member for normally holding tickets in said case in display position, and means for operating said movable members for releasing the coins and tickets, said last named means including trap doors for supporting the tickets and money, an electromagnet, an armature for said electromagnet, means connecting the electromagnet and said trap doors, a circuit for said electromagnet, and means for closing said circuit.

6. In a device of the character described, means to hold a ticket in position to expose a face thereof, means to hold money in position to expose a face thereof, a receptacle for the money, a receptacle for the tickets, means for dumping the money and tickets into their respective receptacles, said last-named means comprising trap doors supporting the tickets and money, an electromagnet, an armature for said electromagnet connected to each of said trap doors, a circuit for said electromagnet, and means for closing said circuit.

JACOB C. STEDMAN.